Sept. 1, 1964 F. H. VAN WINSEN 3,146,862
REMOTE CONTROLLED FLUID-SHOCK-ABSORBER FOR VEHICLES
Filed Sept. 14, 1961
FIG. 1
FIG. 2
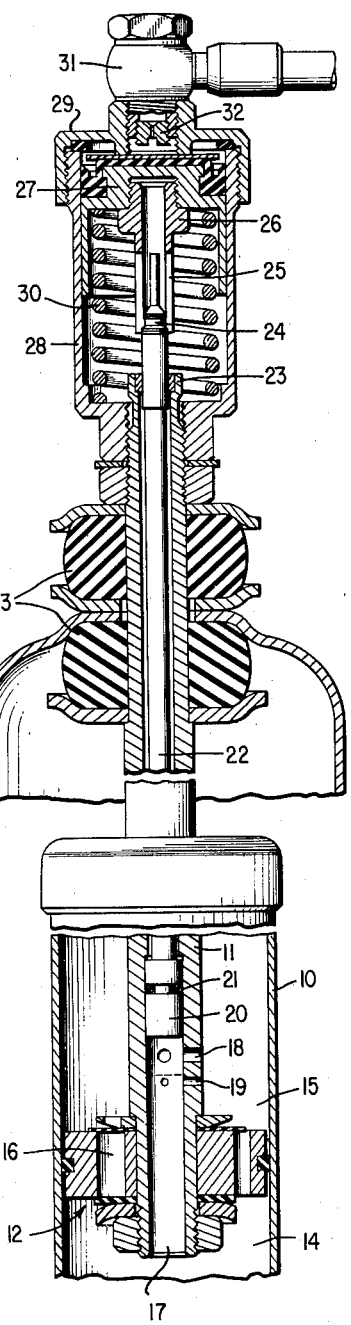
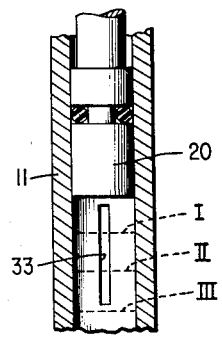
INVENTOR.
FRIEDRICH H. VAN WINSEN
BY *Dicke and Craig*
ATTORNEYS

United States Patent Office 3,146,862
Patented Sept. 1, 1964

3,146,862
REMOTE CONTROLLED FLUID-SHOCK-ABSORBER FOR VEHICLES
Friedrich H. van Winsen, Kirchheim (Teck), Germany, assignor to Daimler-Benz Aktiengesellschaft, Stuttgart-Unterturkheim, Germany
Filed Sept. 14, 1961, Ser. No. 138,154
Claims priority, application Germany Sept. 21, 1960
4 Claims. (Cl. 188—88)

The present invention relates to a fluid shock absorber for vehicles, especially motor vehicles, in which the damping fluid is displaced by means of a damping piston through an overflow cross section from one damping chamber into the other and in which the overflow cross section is adapted to be controlled automatically by a throttling device or the like movable in dependence on the vehicle speed.

With a known fluid shock absorber of this type, an overflow cross section is automatically controlled by a sort of shutter device in such a manner that with an increasing velocity it is increasingly opened. Consequently, the damping effect is increasingly reduced. As measure for the vehicle speed serves, in this prior art construction, the air-flow which is conducted through a funnel and exerts a pressure on a flap operatively connected with the aforementioned shutter. This control arrangement of the prior art construction cooperates in the opposite sense with a temperature responsive tendency which means that the latter increasingly closes the overflow cross section with an increasing temperature of the damping fluid. In practice, an approximately constant damping effect may be expected to be achieved with such a device.

Such prior art control system, however, has an erroneous tendency, for it produces without the temperature-responsive influence, with an increasing driving speed, a decreasing damping effect. Aside from this disadvantage, there still exists the further shortcoming that the dynamic air-flow or wind conditions as well as a possible soiling of the air funnel unfavorably influenced the regulation.

Exhaustive considerations have indicated that the regulation of the shock absorber effect in dependence on the vehicle speed is more important than an influence thereof in dependence on the load of the vehicle. The present invention aims at an automatic adaptation of the damping effect to the vehicle velocity whereby the aforementioned disadvantages and in particular also complicated control and regulating mechanisms are to be avoided.

This problem is solved in accordance with the present invention with shock absorbers of the type described hereinabove by constructing the piston rod carrying the damping piston in a hollow manner and by providing the same with over-flow apertures the cross section of which is adapted to be varied by a slide valve arranged within the piston rod and movable with respect thereto by means of an actuating member loaded by a pressure medium in the sense of a reduction of the overflow cross section with an increasing vehicle speed.

The present invention effectively provides a shock absorber suitably matched to the actual practice. The shock absorber in accordance with the present invention is conceived primarily, though not exclusively, for use in vehicles provided with automatic transmissions. In vehicles provided with automatic transmission there is available for the shifting of the transmission a control pressure continuously variable or variable in a step-like manner which may serve simultaneously for the loading of the actuating member provided in accordance with the present invention for the slide valve in the shock absorbers.

With one embodiment of a construction according to the present invention, the hollow piston rod terminates with the end face thereof in one of the damping chambers and is provided in the side wall thereof with bores as overflow apertures which lead into the other damping chamber. A longitudinally movable slide valve member is arranged within the hollow piston rod for purposes of changing the cross section of these bores which slide valve member controls with a piston section of the spool thereof the apertures within the piston rod, and the valve rod of which extends through the entire hollow piston rod and is operatively connected on the outside thereof with a piston acted upon by a pressure medium and effective as actuating member.

The apertures within the piston rod may be constructed as several bores arranged axially adjacent each other or in groups thereof. The bores may thereby have the same or different diameters. A modified construction representing another possibility in accordance with the present invention essentially consists in arranging as overflow apertures at least one essentially axially extending slot.

A pot-like cylinder is placed over the free end of the piston rod for the accommodation of the actuating piston which pot-like cylinder is closed off by means of a cover and which receives the actuating piston connected with the valve rod. The connection to the pressure medium is disposed within the cover and a possibly interchangeable throttling nozzle may be additionally arranged within the pressure medium supply. The actuating piston is constructed as plunger piston which accommodates on the inside thereof a spring and which is loaded or acted upon by the pressure medium on the end face thereof opposite the cover.

Accordingly, it is an object of the present invention to provide a shock absorber of the type described hereinabove which effectively eliminates the shortcomings and inadequacies of the prior art constructions.

It is another object of the present invention to provide a shock absorber construction for vehicles, especially motor vehicles having an automatic transmission, in which the damping effect is controlled in dependence on the vehicle speed.

Still a further object of the present invention resides in the provision of a shock absorber construction for vehicles in which the damping effect is controlled in dependence on the vehicle speed by control means that are simple in construction, require relatively few parts and assure reliable operation.

A further object of the present invention resides in the provision of a shock absorber construction for vehicles operative in dependence on the vehicle speed which assures proper operation under all driving conditions.

These and other objects, features and advantages of the present invention will become more obvious from the following description when taken in connection with the accompanying drawing which shows, for purposes of illustration only, two embodiments in accordance with the present invention, and wherein—

FIGURE 1 is a cross sectional view through a shock absorber in accordance with the present invention; and FIGURE 2 is a partial cross sectional view through a modified embodiment of a shock absorber in accordance with the present invention, illustrating a modified detail thereof.

Referring now to the drawing wherein like reference numerals are used throughout the two views to designate corresponding parts, and more particularly to FIGURE 1, reference numeral 10 designates therein the housing of the shock absorber which is operatively connected, in a conventional manner, not illustrated herein, with the respective wheel suspension. The piston rod 11 is also connected in a conventional manner by means of rubber cushions 13 with a frame part of the vehicle, for example, with a cross bearer. The housing 10 of the shock absorber is subdivided by a damping piston generally designated by reference numeral 12 into a lower damping chamber 14 and into an upper damping chamber 15. Both damping chambers 14 and 15 are filled with a suitable damping fluid. A suitable compensating space of conventional construction (not illustrated) compensates for the volumetric change during immersion of the piston rod 11 into the housing 10. Conventional throttle apertures 16 are arranged within the damping piston 12 through which, with a movement of the piston, flows the damping fluid from the damping chamber 14 into the damping chamber 15 or vice versa with a corresponding throttling and therewith damping effect.

The piston rod 11 is hollow over the entire length thereof and terminates at the end face 17 thereof within the damping chamber 14. Bores 18 and 19 of different diameter are arranged axially adjacent each other in the piston rod 11 within the area of the damping chamber 15. A slide valve member 20 is arranged within the hollow piston rod 11 the piston section of which is sealed off by means of a sealing ring 21 with respect to the piston rod 11. The valve rod 22 is extended beyond the free end 23 of the piston rod 11 and is provided at the end thereof with an annular groove 24. Springy tongues 25 of a screw cap 26 which is inserted into a plunger piston 27 from the inside thereof engage into the annular groove 24 to establish an operative connection therewith.

The plunger piston 27 constitutes the actuating member for the slide valve member 20. The plunger piston 27 is arranged within a pot-shaped cylinder 28 which is secured at the upper end of the piston rod 11 and is closed off directly on top by a cover 29. A spring 30 is arranged on the inside of the plunger piston 27 which normally forces the plunger piston 27 in the upward direction as viewed in FIGURE 1 against the cover 29. The cover 29 receives the pressure-medium connection 31 provided with a throttling nozzle 32 which may possibly be of the interchangeable type.

The connection 31 is operatively connected, in any suitable appropriate manner, not illustrated herein, with the shifting arrangement of an automatic vehicle transmission (not shown) in such a manner that the control pressure of the fluid medium which is dependent on the vehicle speed either in a continuous or in a step-like manner is able to act on the plunger piston 27. Of course, the connection 31 may also be supplied from any other appropriate independent pressure medium generator means as long as the latter supplies a pressure varying in dependence on the vehicle speed.

During standstill of the vehicle and with relatively small driving speeds, the spool-type slide valve member 20 is in the position illustrated in full lines in FIGURE 1. The damping fluid may thereby flow through the apertures 18 and 19 and the hollow piston rod 11 in a practically unthrottled manner from the damping chamber 15 into the damping chamber 14 and vice versa. The normal throttling apertures 16 are thereby effectively by-passed, so to speak, and the damping effect of the shock absorber is practically eliminated.

If the vehicle speed increases to a predetermined minimum value, then the increasing control pressure displaces the plunger piston 27 in the downward direction as viewed in FIGURE 1 against the spring force of spring 30 and therewith moves the slide valve member 20 into the position thereof shown in dash lines in FIGURE 1. In addition to the normal throttling apertures 16 only the considerably smaller bore or bores 19 are now available as overflow cross section so that the shock absorber offers a considerably larger damping effect. If the vehicle speed increases further and the control pressure also increases, for example, in a step-like manner, then the plunger piston 27 and therewith also the slide valve member 20 is further displaced downwardly against the force of spring 30 so that now also bore 19 will be closed. The overflow cross section formed by bores 18 and 19 is now completely closed and only the throttle apertures 16 present within the damping piston 12 are effective so that the shock absorber can now develop its highest damping effect.

The change in the shock absorber effect takes place in the example described hereinabove in a step-like manner, and more particularly in practice also takes place in such a manner when the control pressure increases continuously with an increasing vehicle speed.

In the embodiment of FIGURE 2, a longitudinal slot 33 is provided within the hollow piston rod 11. The longitudinal slot 33 is increasingly closed by means of the slide valve member 20 described hereinabove during the downward movement thereof. If, for example, the control pressure of the transmission or of the additional pressure pump has three steps, then the slide valve member 20 is displaced with an increasing vehicle speed from the illustrated zero position into the position I, then into the position II, and finally into the position III. It is quite obvious that the overflow cross section in FIGURE 2 which is effectively constituted by the open portion of the slot 33 becomes ever smaller with an increasing vehicle speed and finally is completely closed off. The arrangement with the slot 33 is particularly suitable for a continuous regulation with a continuously variable control pressure.

While I have shown and described two embodiments in accordance with the present invention, it is understood that the same is not limited thereto but is susceptible of many changes and modifications within the spirit and scope thereof, and I therefore do not wish to be limited to the details shown and described herein, but intend to cover all such changes and modifications as are encompassed by the scope of the appended claims.

I claim:

1. A shock absorber construction for vehicles, especially motor vehicles provided with an automatic transmission, having supply means for supplying a fluid pressure medium of which the pressure is varied in accordance with the vehicle speed, comprising shock absorber housing means, damping piston means provided with throttling aperture means, said damping piston means effectively subdividing said housing into two damping chambers adapted to be filled with a damping fluid, hollow piston rod means for said damping piston means, said hollow piston rod means terminating at the end face thereof in one of said damping chamber and being provided with overflow aperture means adapted to be selectively varied in cross section thereof and discharging into the other chamber, and control means for selectively varying the cross section of said overflow aperture means in dependence on the vehicle speed to reduce said cross section with increasing vehicle speed including spool-type slide valve means provided with actuating means in the form of a valve rod extending completely through said piston rod means, said spool-type slide valve means effectively controlling the cross section of said aperture means with a piston section thereof, and means operatively connecting said supply means with said actuating means to operate the latter by the fluid pressure of the former including a pot-like cylinder mounted on the free end of said hollow piston rod means outside of said shock absorber housing, a spring-loaded plunger piston arranged within said cylinder, said plunger piston forming an actuating member for said slide valve means and being loaded by said fluid pressure medium, said pot-like cylinder being provided with a cover, a threaded plug member within said plunger piston provided with springy tongue means adapted to engage within a corresponding annular groove provided in said valve rod for operatively connecting said valve rod with said plunger piston, and connecting means for said pressure medium arranged within said cover and including throttling means.

2. A shock absorber construction for vehicles, especially motor vehicles provided with an automatic transmission, having supply means for supplying a fluid pressure medium of which the pressure is varied in accordance with the vehicle speed, comprising shock absorber housing means, damping piston means provided with throttling aperture means, said damping piston means effectively subdividing said housing into two damping chambers adapted to be filled with a damping fluid, hollow piston rod means for said damping piston means and provided with overflow aperture means adapted to be selectively varied in cross section thereof, and control means for selectively varying the cross section of said overflow aperture means in dependence on the vehicle speed to reduce said cross section with increasing vehicle speed including slide valve means, a valve rod for said slide valve means extending through said piston rod means, and actuating means operated by said fluid pressure medium for said control means including an actuating piston operatively connected with said valve rod, a pot-shaped cylinder placed over the free end of said piston rod means and accommodating therein said actuating piston, and cover means for closing said pot-shaped cylinder, a threaded plug member threadably secured centrally with said actuating piston and including substantially axially extending resilient tongue portions for engagement in an annular groove provided in said valve rod, and pressure-medium connecting means in said cover means to enable connection with said supply means including interchangeable throttling nozzle means, said actuating piston being constructed as a spring-loaded plunger piston which is acted upon by said fluid pressure medium on the face thereof facing said cover means against the spring force.

3. A shock absorber as defined in claim 2, wherein said overflow aperture means includes a plurality of bores extending through said hollow piston rod means and disposed adjacent one another in the axial direction of said piston rod means, said valve means being adapted to selectively close said bores and thereby vary the cross section of the flow path through the flow channel formed by said bores and the hollow of said hollow piston rod means.

4. A shock absorber as defined in claim 2, wherein said overflow aperture means includes an elongated slot extending through said hollow piston rod means, said slot extending lengthwise in the axial direction of said piston rod means, said valve means being adapted to selectively close portions of said slot and thereby vary the cross section of the flow path through the flow channel formed by said slot and the interior of said hollow piston rod means.

References Cited in the file of this patent

UNITED STATES PATENTS

| | | |
|---|---|---|
| 1,394,063 | Camp | Oct. 18, 1921 |
| 1,562,879 | Flentje | Nov. 24, 1925 |
| 2,013,920 | Kulick | Sept. 10, 1935 |
| 2,181,161 | Wolf | Nov. 28, 1939 |
| 2,193,303 | Stringher | Mar. 2, 1940 |
| 2,230,132 | Clarke | Jan. 28, 1941 |
| 2,770,003 | Comey et al. | Nov. 13, 1956 |

FOREIGN PATENTS

| | | |
|---|---|---|
| 736,431 | Great Britain | Sept. 7, 1955 |